United States Patent
Coakley (10) Patent No.: US 7,281,755 B2
(45) Date of Patent: Oct. 16, 2007

(54) VEHICLE SUPPORT STRUCTURE WITH FLOOR IMPACT MOVEMENT RESTRICTION DEVICE

(75) Inventor: David Coakley, Macomb Township, MI (US)

(73) Assignee: Nissan Technical Center North America, Inc. MI (US)

( * ) Notice: Subject to any disclaimer, the term of this patent is extended or adjusted under 35 U.S.C. 154(b) by 115 days.

(21) Appl. No.: 11/005,038

(22) Filed: Dec. 7, 2004

(65) Prior Publication Data

US 2006/0119137 A1    Jun. 8, 2006

(51) Int. Cl.
*B60J 7/00*    (2006.01)
(52) U.S. Cl. ............ 296/187.08; 296/187.03; 296/35.2; 296/204
(58) Field of Classification Search ........ 296/187.03, 296/187.08, 187.09, 35.2, 204
See application file for complete search history.

(56) References Cited

U.S. PATENT DOCUMENTS

| | | | | |
|---|---|---|---|---|
| 3,955,640 | A * | 5/1976 | Yamanaka | 180/271 |
| 4,767,153 | A * | 8/1988 | Kawasaki et al. | 296/193.02 |
| 4,836,321 | A * | 6/1989 | Baumann | 180/232 |
| 5,102,187 | A | 4/1992 | Harasaki | |
| 5,180,206 | A * | 1/1993 | Toyoda | 296/204 |
| 5,267,630 | A * | 12/1993 | Watanabe et al. | 180/297 |
| 5,342,106 | A * | 8/1994 | Fischer | 296/204 |
| 5,352,011 | A * | 10/1994 | Kihara et al. | 296/203.03 |
| 5,636,424 | A | 6/1997 | Singer et al. | |
| 5,915,775 | A * | 6/1999 | Martin et al. | 296/35.2 |
| 6,276,484 | B1 * | 8/2001 | Evans et al. | 180/291 |
| 6,422,631 | B1 * | 7/2002 | Schmidt et al. | 296/68.1 |
| 6,676,198 | B2 * | 1/2004 | Demptos et al. | 296/187.03 |
| 6,786,534 | B1 * | 9/2004 | Peng | 296/187.08 |
| 6,886,884 | B2 * | 5/2005 | Bull et al. | 296/187.08 |
| 2001/0002761 | A1 | 6/2001 | Tsuruta et al. | |
| 2004/0080194 | A1 | 4/2004 | Medvecky et al. | |
| 2006/0102821 | A1 * | 5/2006 | Kuliha et al. | 248/429 |

FOREIGN PATENT DOCUMENTS

| | | |
|---|---|---|
| DE | 19627610 | 1/1998 |
| GB | 2340801 | 3/2000 |

* cited by examiner

*Primary Examiner*—Dennis H. Pedder
*Assistant Examiner*—Mike Hernandez
(74) *Attorney, Agent, or Firm*—Global IP Counselors, LLP (57) ABSTRACT

A vehicle support structure is provided with a floor impact restriction device coupled between a structural floor member of a vehicle floor and a vehicle suspension member supporting the vehicle floor. The floor impact restriction device basically has a suspension attachment member and a floor attachment member. The suspension attachment member has a suspension mounting portion fixedly attached to the vehicle suspension member and a first connecting portion rigidly coupled to the suspension mounting portion. The floor attachment member has a floor mounting portion fixedly attached to the structural floor member and a second connecting portion rigidly coupled to the floor mounting portion. The first and second connecting portions are interlinked together with a limited range of non-contacting movement between the first and second connecting portions.

20 Claims, 6 Drawing Sheets

VEHICLE SUPPORT STRUCTURE WITH FLOOR IMPACT MOVEMENT RESTRICTION DEVICE

BACKGROUND OF THE INVENTION

1. Field of the Invention

The present invention generally relates to a vehicle support structure with a floor impact movement restriction device. More specifically, the present invention relates to a vehicle floor impact movement restriction device that is coupled between a suspension member of a vehicle and a structural floor member of the vehicle.

2. Background Information

In the United States, Federal regulation FMVSS210 establishes requirements for seat belt anchorage points for vehicles to ensure that seats and/or seatbelts within the passenger compartment of a vehicle undergo minimal movement relative to the frame of the vehicle. In Europe, a similar regulation ECE R 14 exists for establishing requirements for seat belt anchorage points in vehicles. To meet these regulations, some vehicles are provided with an impact movement restriction device that connects a floor cross member of the floor to a suspension cross member to limit relative movement therebetween in the event of a collision. For example, in the past, an impact movement restriction device was provided that used a steel wire to interconnect the floor cross member of the floor to a suspension cross member.

While the above mentioned type of impact movement restriction device performs well, it has several drawbacks from a manufacturing perspective. For example, this type of impact movement restriction device can be costly to manufacture and/or assemble. Also, it is desirable to minimize the mass of an impact movement restriction device.

In view of the above, it will be apparent to those skilled in the art from this disclosure that there exists a need for an improved floor impact movement restriction device that meets the above mentioned regulations. This invention addresses this need in the art as well as other needs, which will become apparent to those skilled in the art from this disclosure.

SUMMARY OF THE INVENTION

One object of the present invention is to provide a floor impact movement restriction device that ensures reliable support between a structural member of a vehicle floor and a suspension member of a vehicle.

In accordance with one aspect of the present invention, a vehicle floor impact movement restriction device is provided with a suspension mounting portion, a first connecting portion, a floor mounting portion and a second connecting portion. The suspension mounting portion is configured and arranged to be fixedly attached to a vehicle suspension member of a vehicle. The first connecting portion is rigidly coupled to the suspension mounting portion. The floor mounting portion is configured and arranged to be fixedly attached to a structural floor member of the vehicle. The second connecting portion is rigidly coupled to the floor mounting portion, such that the first and second connecting portions are interlinked together with a limited range of non-contacting movement between the first and second connecting portions.

In accordance with another aspect of the present invention, a vehicle support structure is provided with a vehicle floor, a vehicle suspension member, a suspension attachment member and a floor attachment member. The vehicle floor includes at least one structural floor member. The vehicle suspension member is configured and arranged for supporting the vehicle floor. The suspension attachment member includes a suspension mounting portion fixedly attached to the vehicle suspension member and a first connecting portion rigidly coupled to the suspension mounting portion. The floor attachment member includes a floor mounting portion fixedly attached to the structural floor member and a second connecting portion rigidly coupled to the floor mounting portion. The first and second connecting portions are interlinked together with a limited range of non-contacting movement between the first and second connecting portions.

Since a seat within the vehicle body is typically fixed to the floor and the structural floor member, the coupling between the first and second connecting portions limits any movement of the seat, floor and structural floor member in response to an impact.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
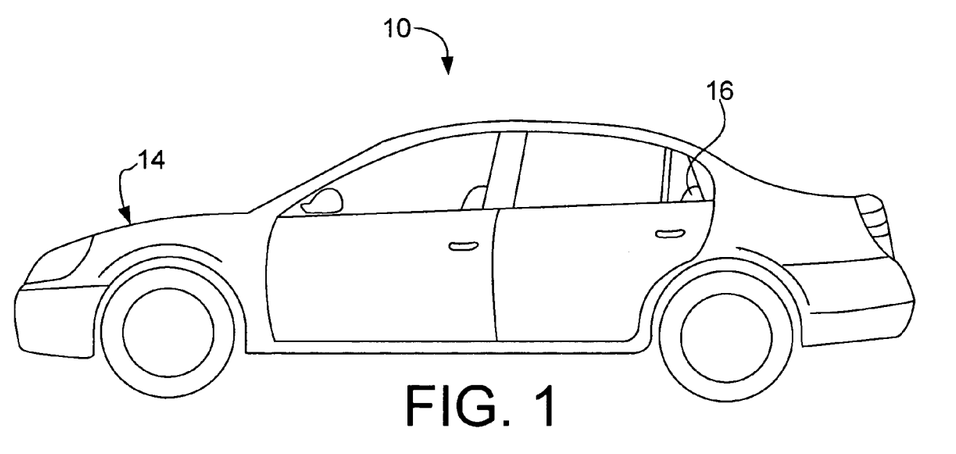
FIG. 1 is a side elevational view of a vehicle equipped with a vehicle floor impact movement restriction device (not shown) in accordance with the present invention.
Figure 2:
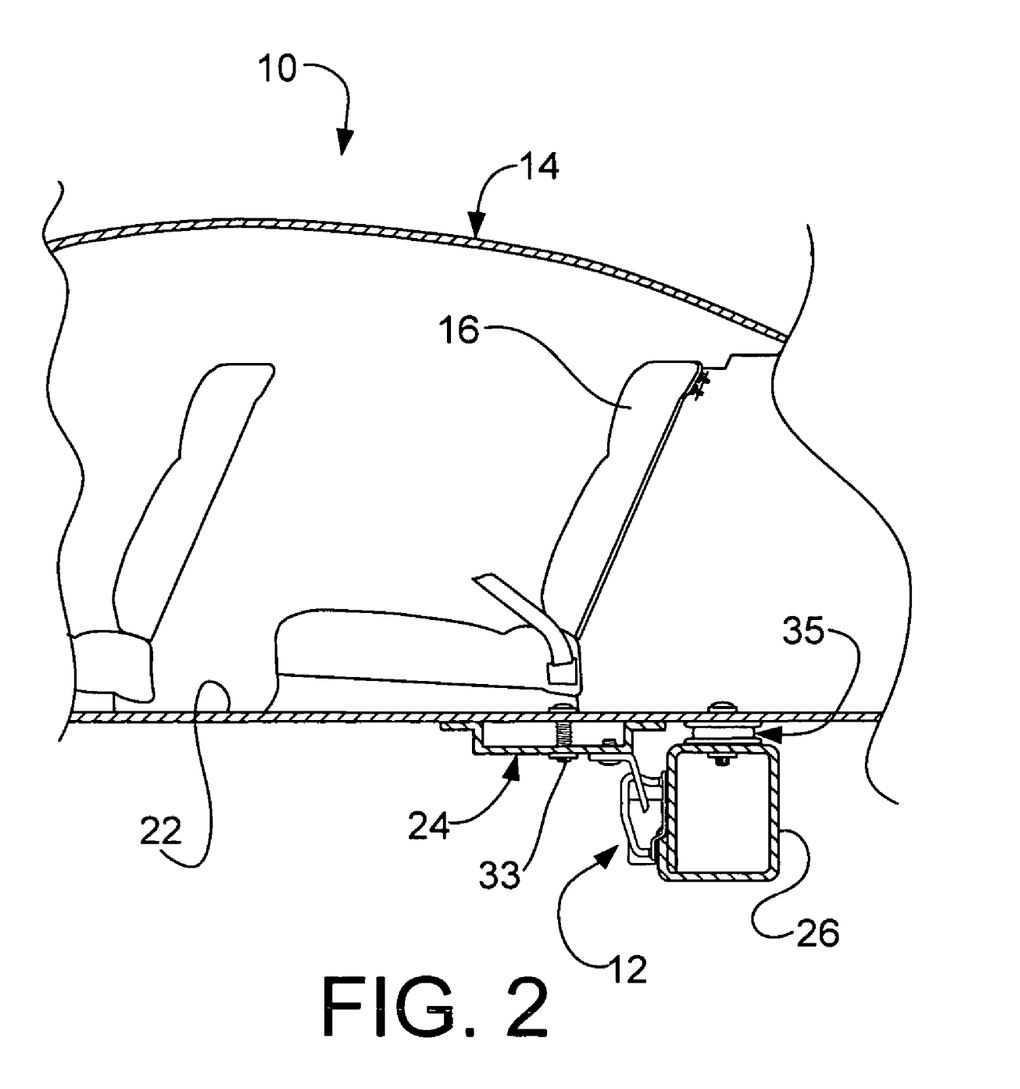
FIG. 2 is a simplified, partial side cross-sectional view of a portion of the vehicle depicted in FIG. 1, equipped with the vehicle floor impact movement restriction device in accordance with the present invention.

Referring initially to FIGS. 1 and 2, a vehicle 10 is illustrated that is equipped with one or more vehicle floor impact movement restriction devices 12 (only one shown FIG. 2) in accordance with the present invention. The precise structure of the vehicle 10 is not critical to the present invention, except to the extent necessary to mount the vehicle floor impact movement restriction device 12. Thus, the structure of the vehicle 10 will be simplified for the purpose of illustration.

Figure 3:
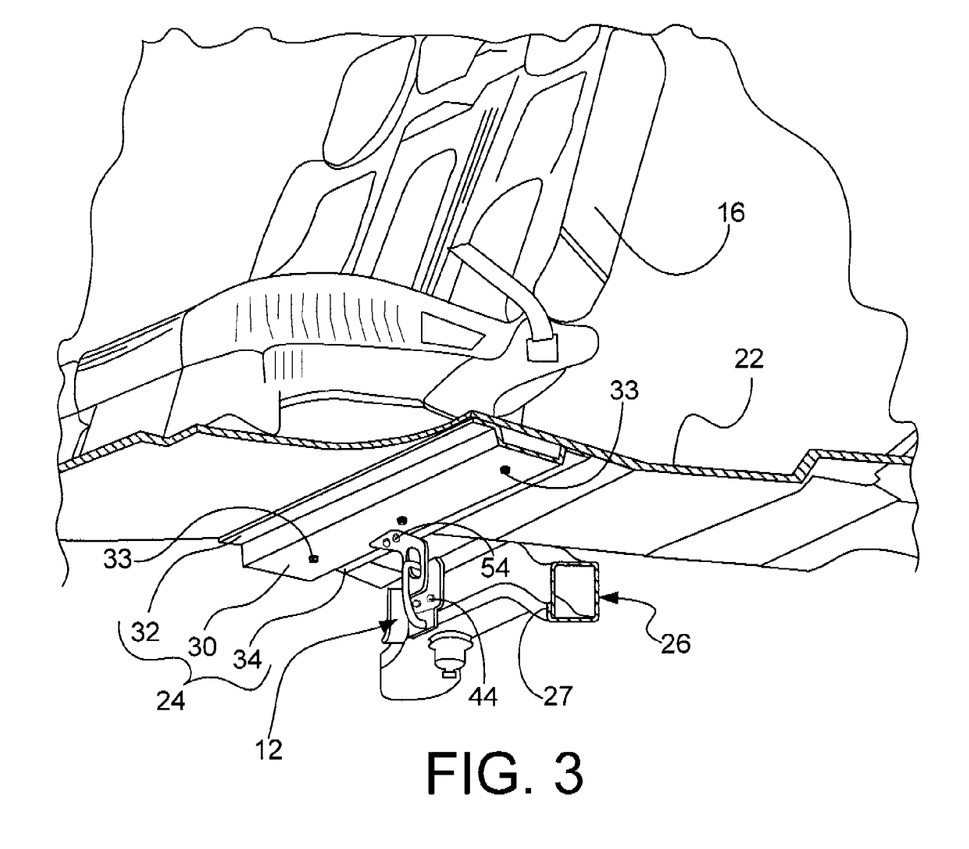
FIG. 3 is a simplified, partial perspective view of the vehicle depicted in FIGS. 1 and 2, showing the underside of the vehicle with the vehicle floor impact movement restriction device attached to structural elements of the vehicle in accordance with the present invention.

As shown in FIGS. 2 and 3, the vehicle 10 includes, among other things, a vehicle support structure 14 defining a passenger compartment with a rear seat 16 fixedly mounted thereto. The vehicle support structure 14 is formed primarily of rigidly connected elements, such as body panels, structural frame elements, doors etc. that are constructed in a conventional manner known in the art. Since these vehicle elements and their constructions are well known, descriptions of these elements are omitted. Only those elements necessary for gaining an understanding of the present invention are described herein.

The vehicle support structure 14 includes, among other things, a vehicle floor 22 that is reinforced by a structural floor member 24, and a vehicle suspension member 26 that supports the vehicle floor 22. The vehicle floor impact movement restriction device 12 is fixedly coupled between the structural floor member 24 and the vehicle suspension member 26 to limit relative movement therebetween in the event of a collision. Thus, the vehicle floor impact movement restriction device 12 forms a part of the vehicle support structure 14.

The floor 22 of the vehicle support structure 14 includes a generally flat area adjacent to the seat 16 of the vehicle 10, and also includes various contoured portions (not shown) to accommodate the various structural and mechanical elements of the vehicle 10 in a well known manner. The vehicle floor 22 is typically formed from sheet metal, pressed or stamped into the desired shape with several of each of the above mentioned flat portions and contoured portions.

Figure 4:
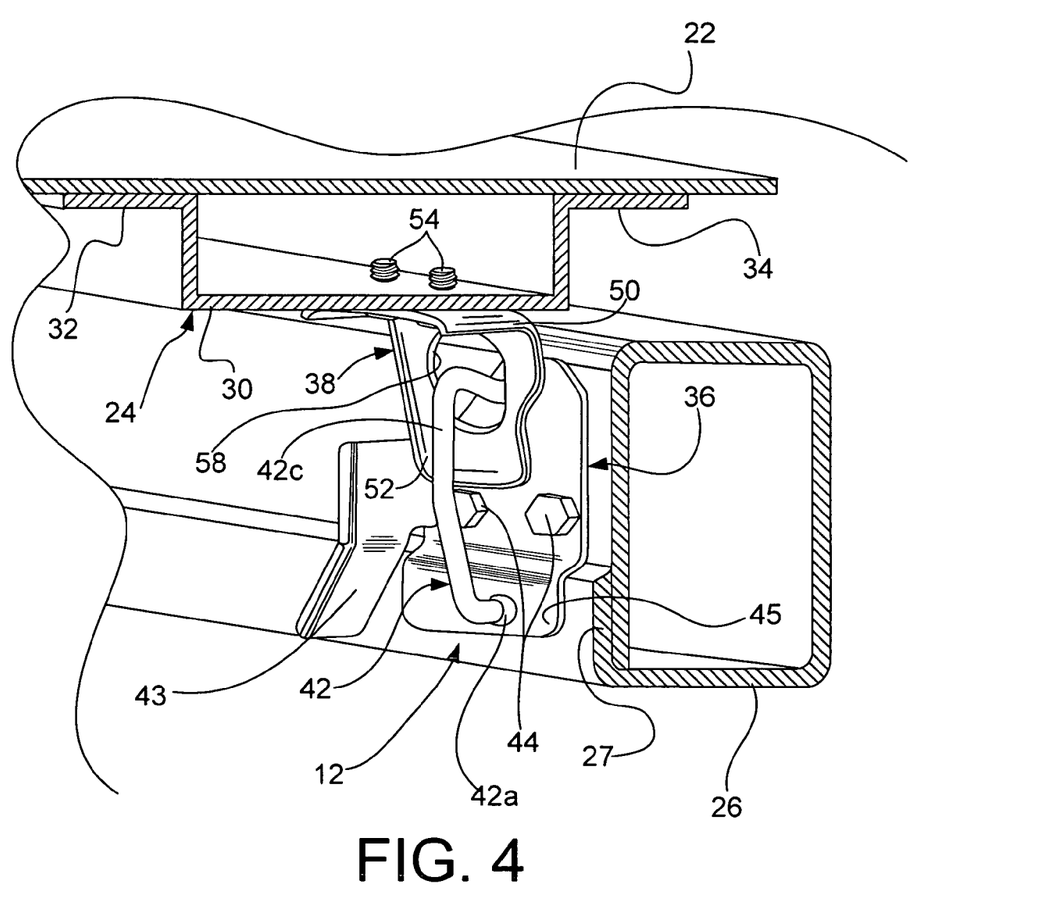
FIG. 4 is an enlarged simplified, partial perspective view of a portion of the vehicle depicted in FIGS. 1-3, showing the connections between the vehicle floor impact movement restriction device and the structural elements of the vehicle in accordance with the present invention.

As best seen in FIGS. 3 and 4, the structural floor member 24 is a structural cross beam or member that is fixedly coupled to the vehicle floor 22. The structural floor member 24 is typically formed of a sheet metal that is formed into an elongated shaped member having a U-shaped central portion 30, a first gusset portion 32 and a second gusset portion 34. The first and second gusset portions 32 and 34 are typically welded to the underside of the vehicle floor 22, as shown in FIGS. 2 to 4, to provide structural reinforcement to the vehicle floor 22. The central portion 30 of the structural floor member 24 is typically spaced apart from the vehicle floor 22. The shape of the structural floor member 24 defines a beam-like structure that provides rigidity and strength to the vehicle floor 22. As is shown in FIGS. 2 and 3, the seat 16 is rigidly fixed to the vehicle floor 22 and the structural floor member 24 by a plurality of bolts 33.

As seen in FIGS. 3 and 4, the vehicle suspension member 26 is an elongated hollow cross beam member that is part of a vehicle suspension (not shown). Typically, the vehicle suspension member 26 is formed by bending a sheet metal into a hollow beam shown in cross-section in FIGS. 2 and 3, in a manner well known in the art. The molded sheet metal that forms the vehicle suspension member 26 is bent to include an overlapping portion 27 (FIG. 4) where the vehicle suspension member 26 is welded together to form the hollow beam shape. The vehicle suspension member 26 is fixedly connected to the vehicle floor 22 by a plurality of connecting members 35 (only one is shown in FIG. 2) which includes a bolt and an elastic cushioning member. The bolt extends through the vehicle floor 22 and an upper portion of the vehicle suspension member 26 to securely fasten one to the other. The bolt also extends through the elastic cushioning member, which is positioned between the floor 22 and the vehicle suspension member 26 to provide cushioning therebetween.

The vehicle suspension member 26 is further connected to suspension elements (not shown) that support the wheels, shock absorbers and brakes (also not shown) in any one of a variety of differing configurations that are known in the art. Since such suspension elements are conventional and well known in the art, the descriptions of the suspension elements are omitted.

Figure 5:
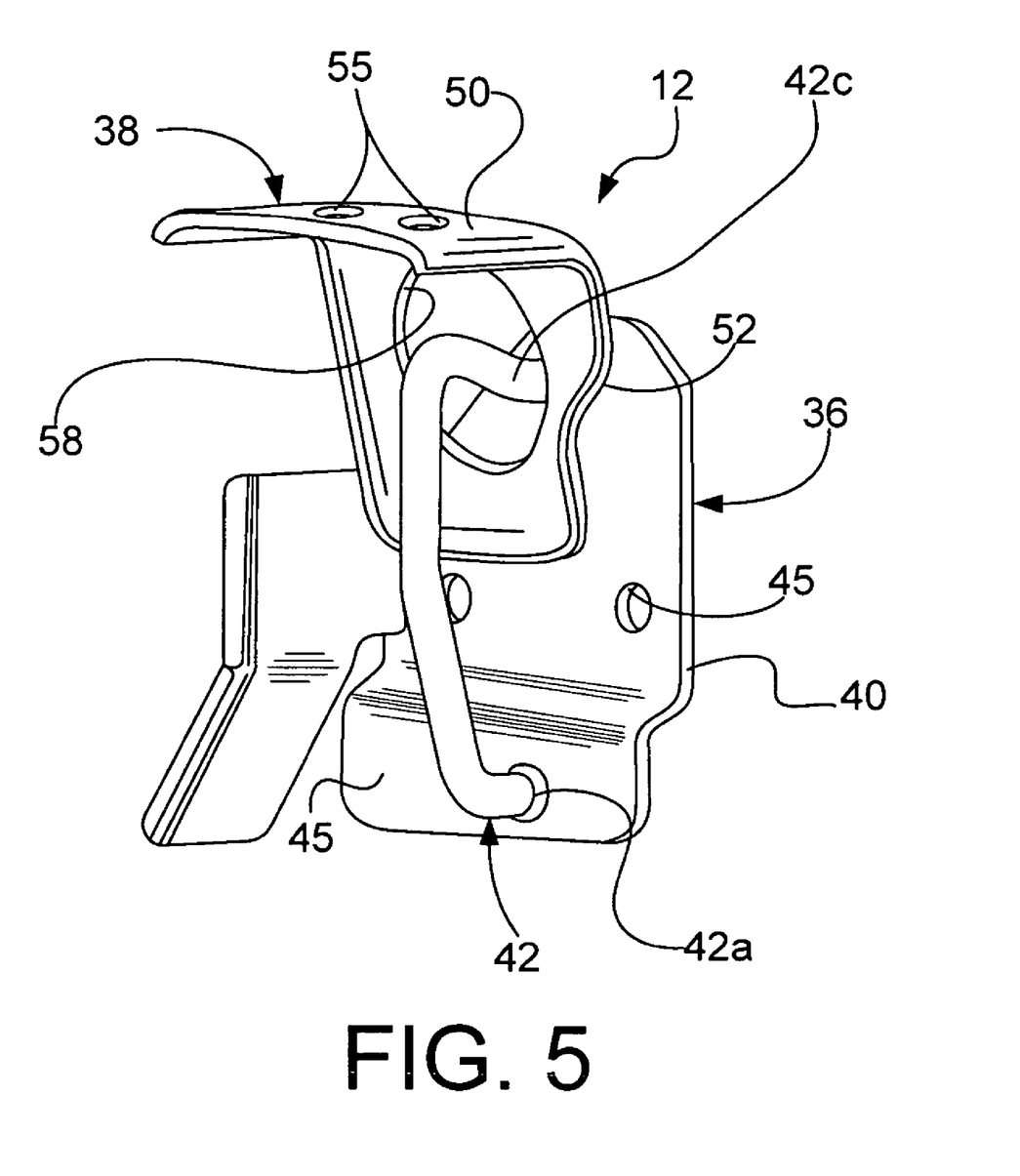
FIG. 5 is an enlarged perspective view of the vehicle floor impact movement restriction device, shown removed from the vehicle in accordance with the present invention.
Figure 6:
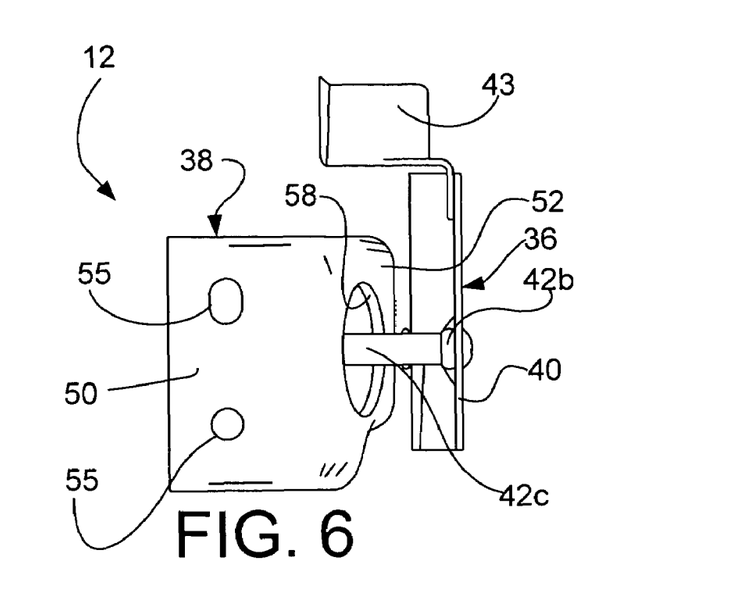
FIG. 6 is a top plan view of the vehicle floor impact movement restriction device depicted in FIG. 5 in accordance with the present invention.
Figure 7:
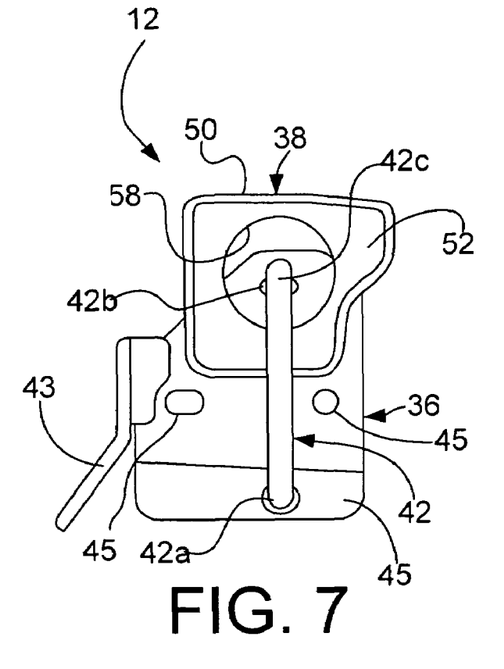
FIG. 7 is a front elevational view of the vehicle floor impact movement restriction device depicted in FIGS. 5 and 6 in accordance with the present invention.
Figure 8:
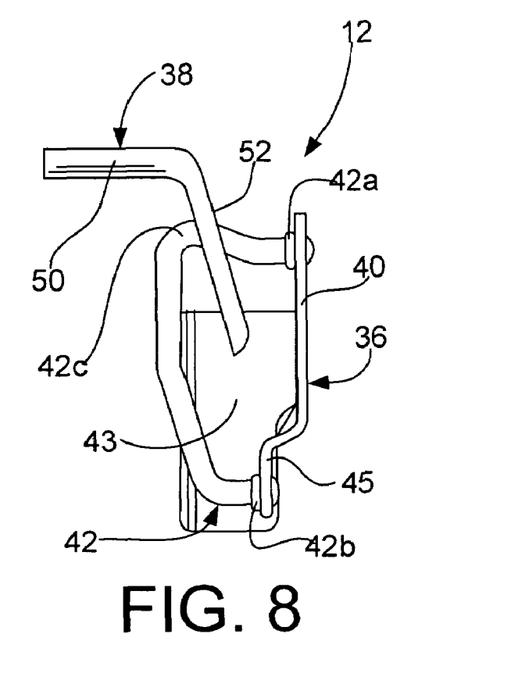
FIG. 8 is a side elevational view of the vehicle floor impact movement restriction device depicted in FIGS. 5-7 in accordance with the present invention.

The vehicle floor impact movement restriction device 12 is shown in FIGS. 2 and 3 attached to the vehicle 10. FIG. 4 depicts the vehicle floor impact movement restriction device 12 on an enlarged scale and shows the rigid connections to both the structural floor member 24 and the vehicle suspension member 26. FIG. 5 depicts the vehicle floor impact movement restriction device 12 removed from the vehicle 10 in order to show details of the device. FIGS. 6, 7 and 8 are top, front and side views of the vehicle floor impact movement restriction device 12, respectively. While only one vehicle floor impact movement restriction device 12 is shown, it will be apparent from this disclosure that the vehicle 10 can have two or more as needed and/or desired.

As shown in FIGS. 4 to 8, the vehicle floor impact movement restriction device 12 of the present invention includes a suspension attachment member 36 and a floor attachment member 38. The suspension attachment member 36 is fixedly attached to the vehicle suspension member 26, while the floor attachment member 38 is fixedly attached to the structural floor member 24. The suspension attachment member 36 and the floor attachment member 38 are interlinked together with a limited range of non-contacting movement therebetween to limit movement of the seat 16 and the structural floor member 24 relative to the vehicle suspension member 26.

The suspension attachment member 36 includes a suspension mounting portion 40, a first connecting portion 42 and an optional splatter guard portion 43. The suspension mounting portion 40 is fixedly and rigidly attached to the vehicle suspension member 26. The first connecting portion 42 is fixedly and rigidly coupled to the suspension mounting portion 40. In this embodiment, suspension mounting portion 40 and the first connecting portion 42 are constructed from separate pieces that are fixedly connected together to form an integrated structure. The optional splatter guard portion 43 is rigidly fixed to the suspension mounting portion 40.

Preferably, the suspension mounting portion 40 is formed from a single piece of a metal sheet material that is stamped. Typically, the suspension mounting portion 40 is rigidly fixed to the vehicle suspension member 26 by a plurality of bolts 44. The bolts 44 extend through a corresponding number of bolt holes 45 formed in the suspension mounting portion 40. Alternatively, the suspension mounting portion 40 can be welded to the vehicle suspension member 26. The suspension mounting portion 40 is further formed with an offset portion 45 that offset from the remainder of the suspension mounting portion 40. The offset portion 45 is shaped to correspond to the contour and shape of the overlapping portion 27 of the vehicle suspension member 26. It should be understood from the drawings and the description of the present invention that the offset portion 45 is an optional feature that is included to accommodate the shape of the vehicle suspension member 26. Alternatively, the vehicle suspension member 26 can be formed with the overlapping portion 27 in a differing orientation and the offset portion 45 of the suspension mounting portion 40 eliminated or relocated.

The first connecting portion 42 is an elongated bent bar member that has been bent into a loop or U-shape. The first connecting portion 42 has first and second ends 42a and 42b that are both welded to the suspension mounting portion 40. A restraining portion 42c is formed between the first and second ends 42a and 42b for linking the floor attachment member 38 to the suspension attachment member 36 as discussed below.

It should be understood from the drawings and the description herein that the first connecting portion 42 can be formed of a rod having a square or rectangular shaped cross section or other shape different from the round shape of the bent bar member depicted in the drawings. Further, the first connecting portion 42 can alternatively be rigidly connected to the suspension mounting portion 40 by any of a variety of connecting elements such as bolts or hooks having the strength and rigidity to hold the first connecting portion 42 onto the suspension mounting portion 40 and withstand desired impacts, forces and stresses associated with vehicle impacts and rapid changes in inertia.

The splatter guard portion 43, as indicated above, is an optional element that can be included in the vehicle floor impact movement restriction device 12 to limit the splattering or spraying of oil and/or debris from important elements proximate the underside of the vehicle 10. The optional splatter guard portion 43 is typically formed from stamped metal that is welded or otherwise rigidly fixed to the suspension mounting portion 40. Alternatively, the suspension mounting portion 40 and the optional splatter guard portion 43 can be formed unitarily from the same stamped metal material.

The floor attachment member 38 includes a floor mounting portion 50 and a second connecting portion 52. In the illustrated embodiment, the floor mounting portion 50 and the second connecting portion 52 are integrally formed together as a one-piece, unitary member. Preferably, the floor attachment member 38 is formed from a single piece of a metal sheet material that is stamped.

The floor mounting portion 50 is rigidly fixedly attached to the structural floor member 24 by a plurality of bolts 54. The bolts 54 extend through bolt holes formed in the floor mounting portion 50. The second connecting portion 52 is rigidly connected to the floor mounting portion 50. The floor mounting portion 50 and the second connecting portion 52 are preferably unitarily formed as a single unit, but can alternatively be formed as two separate elements welded or otherwise rigidly fixed to one another. The second connecting portion 52 is interlinked with the first connecting portion 42 such that there is a limited range of non-contacting movement between the first and second connecting portions 42 and 52. Specifically, the restraining portion 42c of the first connecting portion 42 extends through a restraining aperture 58 formed in the second connecting portion 52 thereby linking the first and second connecting portions 42 and 52 in a manner similar to links in a chain. The suspension attachment member 36 can undergo limited movement with respect to the floor attachment member 38 as a result of the above described coupling.

To achieve the limited range of non-contacting movement between the first and second connecting portions 42 and 52, the restraining aperture 58 has dimensions that are larger than a cross sectional area of restraining portion 42c thereby provide a clearance between the restraining portion 42c of the first connecting portion 42 that extends through the restraining aperture 58. For example, the restraining portion 42c of the first connecting portion 42 and the restraining aperture 58 can be dimensioned such that the clearance is approximately 18 millimeters around the restraining portion 42c of the first connecting portion 42.

The suspension mounting portion 40 and the floor mounting portion 50 of the floor attachment member 38 are formed of stamped metals. Further, the second connecting portion 52 of the floor attachment member 38 is also formed of stamped metal. It should be understood from the drawings and description herein that the floor mounting portion 50 and second connecting portion 52 of the floor attachment member 38 can be unitarily formed as a single element. Alternatively, the floor mounting portion 50 and the second connecting portion 52 can be formed separately and fixed to one another.

In an alternative embodiment, the floor mounting portion 50 can be constructed to include a bent bar member similar to the first connecting portion 42 and a second connecting portion similar to the one described above with a restraining aperture can be formed on the suspension attachment member 36.

The vehicle floor impact movement restriction device 12 is not limited to the specific configuration depicted in the drawings and described above. For example, the vehicle floor impact movement restriction device 12 can be installed in a reversed orientation such that the suspension attachment member 36 is bolted to the structural floor member 24 and the floor mounting portion 50 can be attached to the vehicle suspension member 26.

As is shown in the drawings, the restraining aperture 58 of the second connecting portion 52 and the restraining portion 42c of the first connecting portion 42 completely encircle one another, linking the suspension attachment member 36 and the floor attachment member 38 like chain links such that the suspension attachment member 36 and the floor attachment member 38 can undergo only limited relative movement with respect to one another. Further, the restraining portion 42c of the first connecting portion 42 has a closed looped shape and the restraining aperture 58 of the second connecting portion 52 is formed by a continuous annular surface.

As should be clear from the drawings and description of the present invention, the vehicle floor impact movement restriction device 12 allows the vehicle suspension member 26 to undergo limited unrestricted movement for normal vehicle motion, vibration and response to uneven road conditions. However, in response to an impact, the connection between the structural floor member 24 and the vehicle suspension member 26 by the vehicle floor impact movement restriction device 12 limits movement of the structural floor member 24 and the seat 16.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle floor impact movement restriction device comprising:
   a suspension mounting portion configured and arranged to be fixedly attached to a vehicle suspension member of a vehicle;
   a first connecting portion rigidly coupled to the suspension mounting portion;
   a floor mounting portion configured and arranged to be fixedly attached to a structural floor member of the vehicle; and
   a second connecting portion rigidly coupled to the floor mounting portion,
   the first and second connecting portions being interlinked together with a limited range of non-contacting movement between the first and second connecting portions, with at least one of the first and second connecting portions including an elongated bent bar member, the bent bar member having a pair of ends rigidly fixed to the suspension mounting portion, and one of the first and second connecting portions being formed with a restraining aperture therein, and the elongated bent bar member extending through the restraining aperture.

2. The vehicle floor impact movement restriction device according to claim 1, wherein
   the restraining aperture has dimensions that are larger than a cross sectional area of a restraining portion of the bent bar member extending through the restraining aperture to provide a clearance between the restraining portion of the bent bar member and the one of the first and second connecting portions with the restraining aperture.

3. The vehicle floor impact movement restriction device according to claim 2, wherein
   the restraining portion of the bent bar member and the restraining aperture are dimensioned such that the clearance is approximately 18 millimeters around the restraining portion of the bent bar member.

4. A vehicle floor impact movement restriction device comprising:
   a suspension mounting portion configured and arranged to be fixedly attached to a vehicle suspension member of a vehicle;
   a first connecting portion rigidly coupled to the suspension mounting portion; and
   an L-shaped bracket including a floor mounting portion and a second connecting portion, the second connecting portion being inclined relative to the floor mounting portion, the floor mounting portion being configured and arranged to be fixedly attached to a structural floor member of the vehicle;
   one of the first and second connecting portions includes a stamped metal with a restraining aperture therein, and one of the first and second connecting portions includes elongated bent bar member that extends through the restraining aperture interlinking the first and second connecting portions with a limited range of non-contacting movement between the first and second connecting portions.

5. The vehicle floor impact movement restriction device according to claim 4, wherein
   at least one of the restraining aperture and the elongated bent bar member completely encircles the other one of the restraining aperture and the elongated bent bar member.

6. A vehicle floor impact movement restriction device comprising:
   a suspension mounting portion configured and arranged to be fixedly attached to a vehicle suspension member of a vehicle;
   a first connecting portion rigidly coupled to the suspension mounting portion;
   a floor mounting portion configured and arranged to be fixedly attached to a structural floor member of the vehicle; and
   a second connecting portion rigidly coupled to the floor mounting portion, the first and second connecting portions being interlinked together with a limited range of non-contacting movement between the first and second connecting portions, with one of the first and second connecting portions including a stamped metal with a restraining aperture therein, and one of the first and second connecting portions including an elongated bent bar member that extends through the restraining aperture and the elongated bent bar member having a closed looped shape and the restraining aperture being formed by a continuous annular surface.

7. The vehicle floor impact movement restriction device according to claim 4, wherein
   the suspension mounting portion includes a plurality of bolt mounting holes.

8. The vehicle floor impact movement restriction device according to claim 4, wherein
   the floor mounting portion includes a plurality of bolt mounting holes.

9. The vehicle floor impact movement restriction device according to claim 4, wherein
   the suspension mounting portion is formed from a stamped metal.

10. A vehicle floor impact movement restriction device comprising:
    a suspension mounting portion configured and arranged to be fixedly attached to a vehicle suspension member of a vehicle;
    a first connecting portion rigidly coupled to the suspension mounting portion;
    a floor mounting portion configured and arranged to be fixedly attached to a structural floor member of the vehicle; and
    a second connecting portion rigidly coupled to the floor mounting portion,
    the first and second connecting portions being interlinked together with a limited range of non-contacting movement between the first and second connecting portions, the second connecting portion being integrally formed with the floor mounting portion as a one-piece, unitary member with a restraining aperture and the first connecting portion including an elongated bent bar member looped through the restraining aperture with a free floating relationship therebetween.

11. The vehicle floor impact movement restriction device according to claim 10, wherein the elongated bent bar member completely encircles the restraining aperture to prevent separation of the elongated bent bar member from the restraining aperture.

12. A vehicle support structure comprising:
a vehicle floor including a structural floor member;
a vehicle suspension member supporting the vehicle floor;
a suspension attachment member including a suspension mounting portion fixedly attached to the vehicle suspension member and a first connecting portion rigidly coupled to the suspension mounting portion; and
a floor attachment member including a floor mounting portion fixedly attached to the structural floor member and a second connecting portion rigidly coupled to the floor mounting portion,
the first and second connecting portions being interlinked together with a limited range of non-contacting movement between the first and second connecting portions, with the vehicle suspension member, the suspension attachment member and the floor attachment member being disposed below the vehicle floor,
the suspension mounting portion, the floor mounting portion and one of the first and second connecting portions are formed from stamped metals, at least one of the first and second connecting portions includes an elongated bent bar member, and the other of the first and second connecting portions is formed with a restraining aperture therein, and the elongated bent bar member extends through the restraining aperture, and the bent bar member has a pair of ends rigidly fixed to the suspension mounting portion.

13. The vehicle support structure according to claim 12, wherein
the restraining aperture has dimensions that are larger than a cross sectional area of a restraining portion of the bent bar member extending through the restraining aperture to provide a clearance between the restraining portion of the bent bar member and the one of the first and second connecting portions with the restraining aperture.

14. The vehicle support structure to claim 13, wherein
the restraining portion of the bent bar member and the restraining aperture are dimensioned such that the clearance is approximately 18 millimeters around the restraining portion of the bent bar member.

15. A vehicle support structure comprising:
a vehicle floor including a structural floor member;
a vehicle suspension member supporting the vehicle floor;
a suspension attachment member including a suspension mounting portion fixedly attached to the vehicle suspension member and a first connecting portion rigidly coupled to the suspension mounting portion; and
a floor attachment member including a floor mounting portion fixedly attached to the structural floor member and a second connecting portion rigidly coupled to the floor mounting portion,
the first and second connecting portions being interlinked together with a limited range of non-contacting movement between the first and second connecting portions, with the vehicle suspension member, the suspension attachment member and the floor attachment member being disposed below the vehicle floor, one of the first and second connecting portions including a stamped metal with a restraining aperture therein, and one of the first and second connecting portions includes elongated bent bar member that extends through the restraining aperture, at least one of the restraining aperture and the elongated bent bar member completely encircles the other one of the restraining aperture and the elongated bent bar member, and the elongated bent bar member has a closed looped shape and the restraining aperture is formed by a continuous annular surface.

16. A vehicle support structure comprising:
a vehicle floor including a structural floor member;
a vehicle suspension member supporting the vehicle floor;
a suspension attachment member including a suspension mounting portion fixedly attached to the vehicle suspension member and a first connecting portion rigidly coupled to the suspension mounting portion; and
a floor attachment member including a floor mounting portion fixedly attached to the structural floor member and a second connecting portion integrally formed with the floor mounting portion as a one-piece, unitary member with a restraining aperture, the floor mounting portion being formed from a stamped metal,
the first and second connecting portions being interlinked together with a limited range of non-contacting movement between the first and second connecting portions, with the vehicle suspension member, the suspension attachment member and the floor attachment member being disposed below the vehicle floor,
the first connecting portion includes an elongated bent bar member looped through the restraining aperture with a free floating relationship therebetween.

17. The vehicle support structure according to claim 16, wherein
the elongated bent bar member completely encircles the restraining aperture to prevent separation of the elongated bent bar member from the restraining aperture.

18. The vehicle floor impact movement restriction device according to claim 4, wherein
one of the first and second connecting portions extends in a generally longitudinal direction relative to the vehicle and the other of the first and second connecting portions extends in a generally lateral direction relative to the vehicle.

19. A vehicle floor impact movement restriction device comprising:
a first member including a first mounting portion configured and arranged to be fixedly attached to a first part of a vehicle and a looped shaped bar member rigidly fixed to the first mounting portion; and
a second member including a second mounting portion configured and arranged to be fixedly attached to a second part of the vehicle and a connecting portion rigidly coupled to the second mounting portion, with the connecting portion having a restraining aperture,
the restraining aperture and the looped shaped bar member being non-releasably interlinked together with a limited range of non-contacting movement between the first and second connecting portions as long as the first mounting portion and the looped shaped bar member remain assembled together and the second mounting portion and the vehicle connecting portion remain assembled together.

20. The vehicle floor impact movement restriction device according to claim 19, wherein
the first and second connecting portions are interlinked together with a first range of movement in a longitudinal vehicle direction and a second range of movement in a lateral vehicle direction with the first range of movement being greater than the second range of movement.

* * * * *